US008337242B2

(12) United States Patent
Sun

(10) Patent No.: US 8,337,242 B2
(45) Date of Patent: Dec. 25, 2012

(54) DATA CABLE AND CONNECTOR THEREOF

(75) Inventor: Zheng-Heng Sun, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 150 days.

(21) Appl. No.: 13/050,960

(22) Filed: Mar. 18, 2011

(65) Prior Publication Data

US 2012/0171892 A1 Jul. 5, 2012

(30) Foreign Application Priority Data

Dec. 31, 2010 (CN) .......................... 2010 1 0618180

(51) Int. Cl.
*H01R 13/73* (2006.01)
*H02B 1/01* (2006.01)

(52) U.S. Cl. ......................... 439/564; 439/499; 439/638

(58) Field of Classification Search .................. 439/505, 439/564, 148, 149, 577, 638, 499
See application file for complete search history.

(56) References Cited

U.S. PATENT DOCUMENTS

| | | | | |
|---|---|---|---|---|
| 6,648,676 | B1 * | 11/2003 | Lee | 439/499 |
| 6,719,591 | B1 * | 4/2004 | Chang | 439/638 |
| 7,794,273 | B2 * | 9/2010 | Xu et al. | 439/555 |
| 2004/0242064 | A1 * | 12/2004 | Chang et al. | 439/564 |
| 2006/0276083 | A1 * | 12/2006 | Sun | 439/638 |
| 2012/0129386 | A1 * | 5/2012 | Sun | 439/540.1 |
| 2012/0231659 | A1 * | 9/2012 | Sun et al. | 439/577 |

* cited by examiner

*Primary Examiner* — Hae Moon Hyeon
(74) *Attorney, Agent, or Firm* — Altis Law Group, Inc.

(57) ABSTRACT

A data cable includes a first connector, two bolts, a number of wires extending from the first connector, and at least one connector electrically connected to the wires. The first connector includes an insulated main body. The main body includes an elongated installing portion and a short connection portion extending from a rear side of the installing portion. Opposite ends of the installing portion each define a through hole, and opposite ends of the connection portion each define a receiving hole. The bolts are configured to be detachably received in the receiving holes, and operable to mount the first connector to an object via the through holes.

8 Claims, 2 Drawing Sheets

DATA CABLE AND CONNECTOR THEREOF

BACKGROUND

1. Technical Field

The present disclosure relates to a data cable and a connector for the data cable.

2. Description of Related Art

With advances in the computer technology, serial advanced technology attachment (SATA) connectors are more and more commonly used in disk drives and other storage peripherals. The SATA connectors include SATA power connectors and SATA signal connectors, and a SATA power connector and a SATA signal connector are integrated as an integrated connector fastened to an enclosure of a computer or server. Generally, the integrated connector defines two screw holes, and two bolts are fastened in the two screw holes. When the integrated connector is fastened to the enclosure, the two bolts are disassembled from the two screw holes, and then the two bolts extend through the enclosure and engage in the two screw holes to fasten the integrated connector to the enclosure, which wastes time and is inconvenient.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
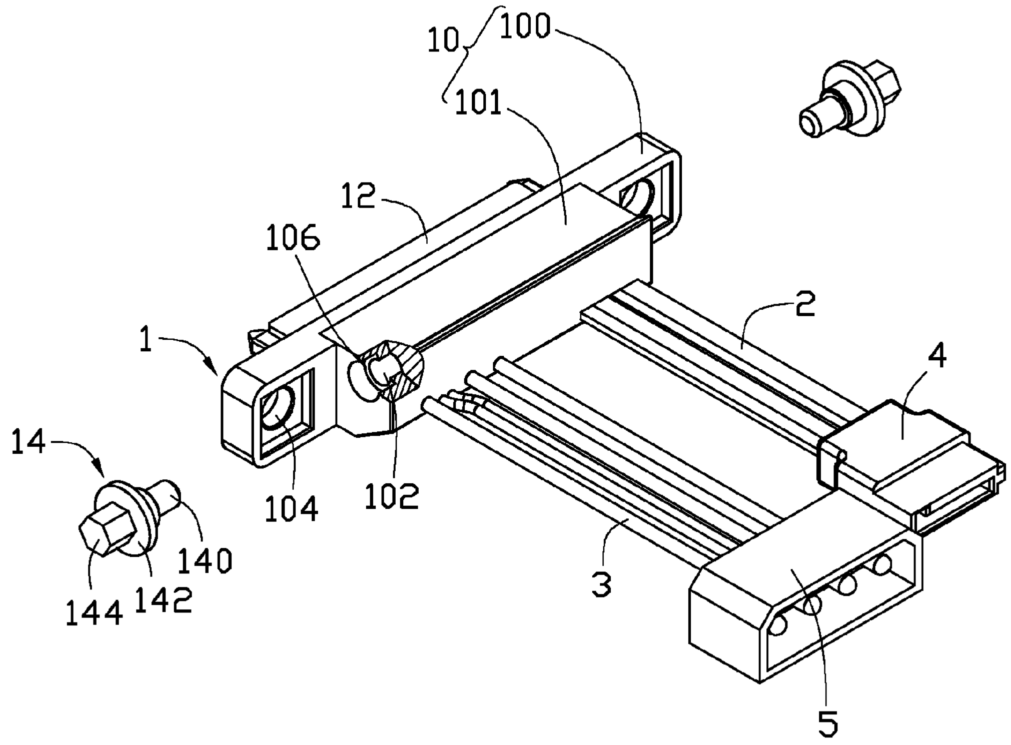
FIG. 1 is an exploded, isometric view of an exemplary embodiment of a data cable, with a portion cut away.
Figure 2:
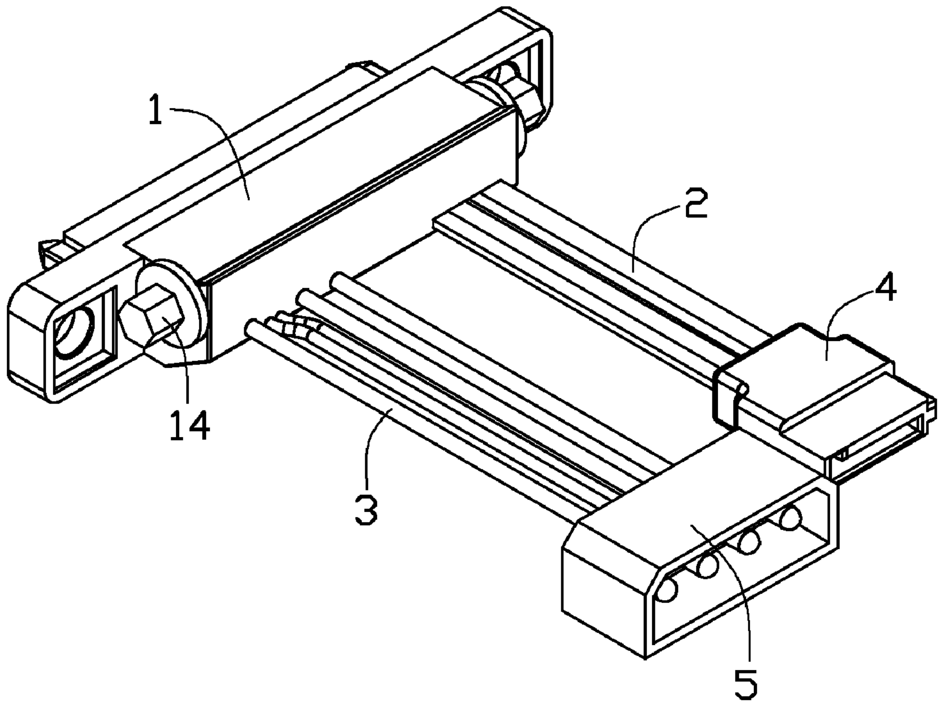
FIG. 2 is an assembled, isometric view of the data cable of FIG. 1.

Referring to FIGS. 1 and 2, an exemplary embodiment of a date cable includes a first connector 1, a plurality of first wires 2 and a plurality of second wires 3 extending from the first connector 10. A second connector 4 connected to the first wires 2 opposite to the first connector 1, a third connector 5 connected to the second wires 3, opposite to the first connector 1, and two bolts 14 detachably received in the first connector 1. In this embodiment, the first connector 1 is a SATA connector integrated with a SATA power connector and a SATA signal connector, and configured to be electrically connected to a hard disk. The first wires 2 are SATA signal wires and the second wires 3 are SATA power wires, correspondingly, the second connector 4 is a SATA signal connector and the third connector 5 is a SATA power connector. The second and third connectors 4 and 5 are configured to be electrically connected to a motherboard.

The first connector 1 includes an insulated main body 10 made of resilient material such as plastic, a conductive portion 12 extending from a front side of the main body 10. The first wires 2 and the second wires 3 extend from a rear side of the main body 10. The main body 10 includes an elongated installing portion 100 and a short connection portion 101 extending from a rear side of the installing portion 100. The conductive portion 12 extends from a front side of the installing portion 100, and the first and second wires 2 and 3 extend from a rear side of the connection portion 101. Opposite ends of the installing portion 100 each define a through hole 104. The bolts 14 are capable of engaging in the through holes 104 to fasten the first connector 1 to an enclosure (not shown). Opposite ends of the connection portion 101 each define a receiving hole 102. Each receiving hole 102 is substantially T-shaped and includes a restricting surface 106.

Each bolt 14 includes a stepped rod 140, an operation block 144 longitudinally extending from an extremity of a greater portion of the rod 140, and a flange 142 radially extending from the extremity of the larger portion of the rod 140. A diameter of the greater portion of the rod 140 is a little larger than a diameter of each receiving hole 102. A lesser portion of each rod 140 is inserted into a corresponding receiving hole 102, and the greater portion of each rod 140 resiliently resists against an inner surface bounding the corresponding receiving hole 102. The flange 142 of each bolt 14 resists against a corresponding end surface of the connection portion 101.

In use, the bolts 14 are directly drawn out from the receiving holes 120 of the first connector 1 by operating the operation block 144, and then the bolts 14 extend through the enclosure to engage in the through holes 104 to fasten the first connector 1 to the enclosure, which is convenient.

It is to be understood, however, that even though numerous characteristics and advantages of the embodiments have been set forth in the foregoing description, together with details of the structure and function of the embodiments, the present disclosure is illustrative only, and changes may be made in details, especially in matters of shape, size, and arrangement of parts within the principles of the embodiments to the full extent indicated by the broad general meaning of the terms in which the appended claims are expressed.

The invention claimed is:

1. A data cable comprising:

a first connector comprising an insulated installing portion, an insulated connection portion extending from a rear side of the installing portion, opposite ends of the installing portion each defining a through hole, and opposite ends of the connection portion each defining a receiving hole;

two bolts configured to be detachably received in the receiving holes, and operable to mount the first connector to an object via the through holes;

a plurality of wires extending from a rear side of the connection portion; and at least one connector electrically connected to the wires.

2. The data cable of claim 1, wherein the connection portion is made of resilient material, each bolt is inserted into a corresponding one of the receiving holes by resiliently resisting against an inner surface of the corresponding receiving hole.

3. The data cable of claim 2, wherein a section of each receiving hole is substantially T-shaped, and each bolt comprises a stepped rod, a diameter of a greater portion of the rod is a little larger than a diameter of the receiving hole.

4. The data cable of claim 1, wherein the first connector is a serial advanced technology attachment (SATA) connector comprising a SATA power connector and a SATA signal connector.

5. The data cable of claim 4, wherein the plurality of wires comprises a plurality of first wires electrically connected to the SATA signal connector and a plurality of second wires electrically connected to the SATA power connector, a second connector is electrically connected to an extremity of the first wires opposite to the first connector, and a third connector is electrically connected to an extremity of the second wires opposite to the first connector, wherein the first wires are SATA signal wires and the second wires are SATA power wires, and correspondingly the second connector is a SATA signal connector and the third connector is a SATA power connector.

6. A connector comprising:

an insulated main body comprising an elongated installing portion and a connection portion extending from a rear side of the installing portion, opposite ends of the installing portion each defining a through hole, and opposite ends of the connection portion each defining a receiving hole; and two bolts configured to be detachably received in the receiving holes, and operable to mount the connector to an object via the through holes.

7. The connector of claim 6, wherein the insulated main body is made of resilient material, each bolt is inserted into a corresponding one of the receiving holes by resiliently resisting against an inner surface of the corresponding receiving hole.

8. The connector of claim 7, wherein a section of each receiving hole is substantially T-shaped, and each bolt comprises a stepped rod, a diameter of a greater portion of the rod is a little larger than a diameter of the receiving hole.

* * * * *